US009552223B2

(12) United States Patent
Fontenot et al.

(10) Patent No.: US 9,552,223 B2
(45) Date of Patent: Jan. 24, 2017

(54) POST-RETURN ASYNCHRONOUS CODE EXECUTION

(71) Applicant: International Business Machines Corporation, Armonk, NY (US)

(72) Inventors: Nathan Fontenot, Georgetown, TX (US); Robert C. Jennings, Jr., Austin, TX (US); Joel H. Schopp, Austin, TX (US); Michael T. Strosaker, Austin, TX (US); George C. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/501,130

(22) Filed: Sep. 30, 2014

(65) Prior Publication Data

US 2016/0092264 A1     Mar. 31, 2016

(51) Int. Cl.
  *G06F 9/455*  (2006.01)
  *G06F 9/46*   (2006.01)
  *G06F 9/48*   (2006.01)

(52) U.S. Cl.
  CPC .......... *G06F 9/4843* (2013.01); *G06F 9/4881* (2013.01); *G06F 9/4806* (2013.01); *G06F 9/4812* (2013.01)

(58) Field of Classification Search
  CPC .......................................... G06F 9/41–9/4881
  See application file for complete search history.

(56) References Cited

U.S. PATENT DOCUMENTS

| 6,061,709 A * | 5/2000 | Bronte | G06F 9/4812 718/102 |
| 6,510,448 B1 * | 1/2003 | Churchyard | G06F 9/4843 712/228 |
| 7,234,139 B1 * | 6/2007 | Feinberg | G06F 9/45504 718/1 |
| 2002/0078122 A1 * | 6/2002 | Joy | G06F 9/3842 718/102 |
| 2004/0117793 A1 * | 6/2004 | Shaylor | G06F 9/4881 718/100 |
| 2006/0161921 A1 * | 7/2006 | Kissell | G06F 8/4442 718/102 |
| 2006/0190945 A1 * | 8/2006 | Kissell | G06F 9/3851 718/108 |
| 2007/0266387 A1 * | 11/2007 | Henmi | G06F 9/4843 718/102 |

(Continued)

OTHER PUBLICATIONS

George V. Neville-Neil, FreeBSD Process Management, Chapter 4.3 Context Switching, 2005, pp. 1-11.*

(Continued)

*Primary Examiner* — Thuy Dao
*Assistant Examiner* — Mongbao Nguyen
(74) *Attorney, Agent, or Firm* — Nicholas D. Bowman

(57) ABSTRACT

A method, system, and computer program product for the prioritization of code execution. The method includes accessing a thread in a context containing a set of code instances stored in memory; identifying sections of the set of code instances that correspond to deferrable code tasks; executing the thread in the context; determining that the thread is idle; and executing at least one of the deferrable code tasks. The deferrable code task is executed within the context and in response to determining that the thread is idle.

5 Claims, 6 Drawing Sheets

(56) References Cited

U.S. PATENT DOCUMENTS

| | | | | |
|---|---|---|---|---|
| 2008/0126613 | A1* | 5/2008 | Gilgen | G06F 13/387 710/36 |
| 2008/0155536 | A1* | 6/2008 | Levit-Gurevich | G06F 9/4843 718/1 |
| 2008/0271042 | A1* | 10/2008 | Musuvathi | G06F 11/3688 718/108 |
| 2009/0113436 | A1* | 4/2009 | Cwalina | G06F 9/4425 718/102 |
| 2009/0328058 | A1* | 12/2009 | Papaefstathiou | G06F 9/485 718/107 |
| 2010/0107168 | A1* | 4/2010 | Auerbach | G06F 12/0269 718/103 |
| 2010/0299665 | A1* | 11/2010 | Adams | G06F 9/45533 718/1 |
| 2011/0004883 | A1* | 1/2011 | El-Moursy | G06F 9/4881 718/103 |
| 2011/0289361 | A1* | 11/2011 | Kuiper | G06F 9/5033 714/45 |
| 2012/0072891 | A1 | 3/2012 | Hewitt | |
| 2012/0246652 | A1* | 9/2012 | King-Smith | G06F 9/4843 718/102 |
| 2013/0024867 | A1* | 1/2013 | Glew | G06F 9/4881 718/104 |
| 2013/0160023 | A1* | 6/2013 | Suzuki | G06F 9/4887 718/104 |
| 2013/0167126 | A1 | 6/2013 | Iyer et al. | |
| 2014/0149697 | A1* | 5/2014 | Thomsen | G06F 11/00 711/162 |
| 2014/0181423 | A1* | 6/2014 | Dice | G06F 9/5027 711/151 |
| 2014/0282574 | A1* | 9/2014 | Marathe | G06F 9/4881 718/103 |
| 2014/0317631 | A1* | 10/2014 | Ryshakov | G06F 9/4881 718/103 |
| 2014/0359632 | A1* | 12/2014 | Kishan | G06F 9/4881 718/103 |
| 2015/0309874 | A1* | 10/2015 | Liang | H03M 13/3761 714/766 |

OTHER PUBLICATIONS

Shang Rong Tsai, "Deferrable Functions in Linux", 23 pages, Dec. 14, 2004. http://www.docstoc.com/docs/125817792/Deferrable-Functions-in-Linux.

* cited by examiner

600

```
function analyze_data(data)
     read_data(data)
     [deferrable] {
          trace(data)
     }
     output = process_data(data)
     [deferrable] {
          trace(output)
     }
     store(output)
     exit
```

FIG. 6

POST-RETURN ASYNCHRONOUS CODE EXECUTION

BACKGROUND

The present disclosure relates to asynchronous code execution, and more specifically, to post-return asynchronous code execution.

Work may be required to produce an intended result of a function within a computer application. Often, additional work is required after the intended result is achieved, but the additional work may not be critical to the intended result. The additional work may include logging or housekeeping tasks. Typically, these tasks are executed by the processor before returning the result from the function, which may be sub-optimal for performance.

SUMMARY

Embodiments of the present disclosure provide for a method, system and computer program product for post-return asynchronous code execution.

One embodiment is directed toward a method for the prioritization of code execution. The method includes accessing a thread in a context containing a set of code instances stored in memory. The method also includes identifying sections of the set of code instances that correspond to deferrable code tasks. The method also includes executing the thread in the context. The method also includes determining that the thread is idle. The method also includes executing, within the context and in response to determining that the thread is idle, at least one of the deferrable code tasks.

Another embodiment is directed toward a system for the prioritization of code execution. The system includes a memory storing a thread containing a set of code instances in a context. The system also includes at least one computer processor circuit that is configured to prioritize code execution. The prioritization of code execution is configured to identify sections of the set of code instances that correspond to deferrable code tasks. The prioritization of code execution is also configured to determine whether the thread is idle. The prioritization of code execution is also configured to execute, in the context, the deferrable code tasks in response to determining that the thread is idle.

Another embodiment is direction toward a computer program product for the prioritization of code execution.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 6 illustrate an exemplar of code for executing code on a thread, according to various embodiments.

Figure 1:
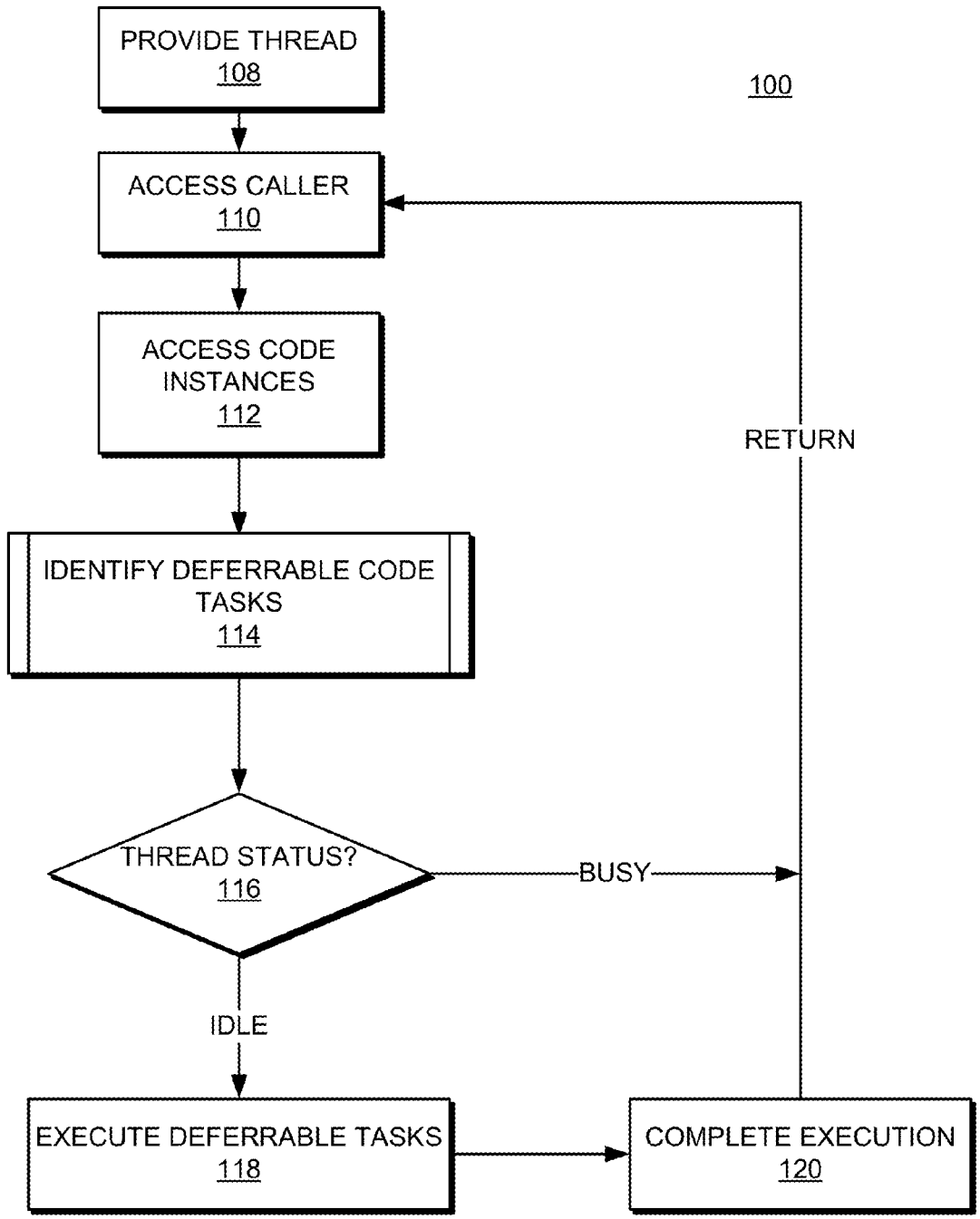
FIG. 1 illustrates a flowchart of a method for executing code on a thread, according to various embodiments.

While the embodiments are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to execution prioritization; more particular aspects relate to scheduling execution of deferrable code tasks in a thread without maintaining reference counts.

Described herein are various methods and systems by which an intended result may take priority in code execution, which may be accomplished through deferral of certain code tasks that are deemed less important. In contrast to existing schemes, received code tasks may be deferred for later execution on a thread, when the thread is otherwise idle, without utilizing reference counts. The received code tasks may be decorated as deferrable if found to be non-essential. Code tasks decorated as deferrable or non-deferrable may accordingly be prioritized for execution on a thread. The intended result of a function may include various non-deferrable code tasks, which may be given priority over other code tasks to be executed on a thread.

While the present disclosure is not necessarily limited to such applications, various aspects of the disclosure may be appreciated through a discussion of various examples using this context.

While various numbers may be used to identify same named elements within this disclosure, this practice is not intended to limit the scope of the disclosure. Identified elements in one figure may be the same or substantially similar to other same named elements in other figures.

This disclosure describes executing deferrable instances of code asynchronously in the same thread and context as the execution runtime, which may provide improvements in terms of overall system overhead and efficiency. A thread becoming idle may trigger the execution of deferred code.

This disclosure further describes various methods by which a section of code, either previously identified by an author (e.g., a programmer, computer scientist, computer engineer, coder, etc.) as "less important," "non-essential," or simply "deferrable" due to its nature, or identified using various computer-implemented methods, may be deferred. Examples of deferrable code may include sections of code related to cleanup or logging. The deferred code may be run in the same thread and context, but may be executed at a time when it would be less detrimental to a thread's execution runtime performance (e.g., when the thread is idle).

In embodiments, execution in computer and software engineering is the process by which a computer or a virtual machine performs the instructions of a computer program. The instructions in the program may trigger sequences of simple actions, such as code tasks, on the executing machine. For example, a program, such as an operating system, may be executed on a computer system.

In embodiments, an instance is a specific realization of any object. Instance may be synonymous with "object," as they are each a particular value (realization). Instance may emphasize the distinct identity of an object, and the creation of an instance may be referred to as instantiation. An instance may contain one or more code tasks for execution.

In embodiments, a code task, sometimes known as a code string, is generally a string of characters, either as a literal constant or as some kind of variable. A code task is generally understood as a data type and is often implemented as an array of bytes that stores a sequence of elements, typically characters, using some character encoding. Code tasks may include actions that produce effects according to the semantics of the instructions in a program.

In embodiments, non-blocking generally denotes a form of processing (including execution) that permits other processing to continue before the transmission has finished. A blocking scheme is generally a simple approach where execution begins and does not stop until all code strings are executed. Non-blocking is generally a characteristic of asynchronous execution.

In embodiments, execution runtime is the time during which a program is running. This is in contrast to various other phases of a program's lifecycle such as compile time, link time, load time, etc. Execution runtime may be the main program flow.

In embodiments, a return statement causes execution to leave the current subroutine and resume at the point in the code immediately after where the subroutine was called, known as the return address. The return address is saved, usually on the process's call stack, as part of the operation of making the subroutine call. Return statements may allow a function to specify a return value to be passed back to the code that called the function. Post-return accordingly refers to a state of code after the execution leaves the previous subroutine and has resumed at the point in the code immediately after where the subroutine was called.

In embodiments, a call stack is a stack data structure that stores information about the active subroutines of a computer program. The call stack may also be referred to as the execution stack or the runtime stack. A purpose of the call stack is to keep track of the point to which each active subroutine should return control when it finishes executing.

In embodiments, a thread of execution is the smallest sequence of programmed instructions that can be managed independently by a scheduler, typically as part of an operating system. The implementation of threads and processed may differ between various operating systems, but in various examples a thread may be a component of a process.

In embodiments, a context is the minimal set of data used by a task that must be saved to allow a task interruption of a given date, and a continuation of the task at the point it has been interrupted and at an arbitrary future date. The concept of context may assume significance in the case of interruptible tasks, wherein upon being interrupted the processor saves the context and proceeds to serve the interrupt service routine. As a general rule, the smaller the context, the smaller the associated latency.

In embodiments, a thread may be idle. A thread being idle means that the thread is not currently executing code or the thread is blocked. A thread may be idle for various reasons, including, but not limited to, the thread spinning on a lock or the thread being currently blocking on I/O. A thread may be idle if a thread of execution has no code tasks awaiting execution. For example, if a thread has a queue of code tasks, but the queue currently has no code tasks awaiting execution, the thread may be idle. Another example of an idle thread would be where the thread has code tasks awaiting execution, but for various reasons, the thread is unable to complete execution of the currently executing code task. In this case, the thread may be blocking on a computer component, such as an I/O component.

In embodiments, a critical path may be the longest necessary (or, shortest possible) path through a network of activities when respecting their interdependencies, which may be identified by various methods. In other words, a critical path is the path taken that allows the fastest completion or transmission.

In embodiments, decoration, is a form of metadata associated with a code task. Metadata is data about other data. Decoration is metadata that adds a defining characteristic to a code task, for various purposes. Decoration of code tasks may refer more generally, as used herein, to decoration, annotation and various other schemes by which code tasks may be identified or tagged. Depending on the programming language, among other factors, various terms may be used to refer to decoration.

In embodiments, asynchronous instances are instances executed in a non-blocking execution scheme, allowing the execution runtime to continue execution. Asynchronous instances may occur independently of instances in the execution runtime (i.e., main program flow). In other words, non-essential or deferrable instances may generally be considered for asynchronous execution and may not be given priority over instances that are deemed non-deferrable (essential). Thus, asynchronous instances, relative to synchronous instances, may be executed with reduced impact on the thread of execution.

In existing methods and systems, on multi-processor or multi-threaded systems, a non-essential instance may be offloaded to another thread of execution, if characterized as an asynchronous instance. This may involve one or more changes of context, which may lead to inefficiencies. Saving and loading contexts creates wait times or latency, which may slow down system performance. This disclosure instead describes the use of one thread of execution in a context on a processor, thereby improving latency and speed of execution.

In embodiments described herein, an affirmative approach is described wherein a program may specifically indicate than an action must be taken, but may also indicate that the action may optionally be deferred. Furthermore, unlike various existing methods of asynchronous execution, such as garbage collection, decoration of code tasks may designate whether a code task is to be executed asynchronously. In garbage collection schemes, reference counts may instead by utilized. In other words, for garbage collection, where there are no more references to an object, its allocated memory becomes available for reclamation. Garbage collection may be implemented as a task that runs through a list of all the allocated objects, looking for those with a reference count of zero. Described further herein, embodiments of the present disclosure are directed toward an affirmative approach, in which a program specifically indicates that an action should be taken (such as freeing memory). By avoiding the utilization of reference counts, performance may be improved. In certain embodiments, various actions (such as execution) may optionally be deferred on a thread.

According to various embodiments, a method may include receiving command code on a thread on a processor in a computer system. The command code, referred to herein as code instances, may contain functions to be completed, both essential and deferrable, by the processor. The functions may be programs to be run on a computer, according to various embodiments. The programs may contain both non-deferrable and deferrable tasks.

Various code instances may be broken down into one or more specific code tasks. The code tasks may be labeled through decoration by various means within a function for execution asynchronously after returning a result of a function. This may be used to designate non-essential work, such as cleanup of local variables or logging, for deferral until the thread is idle.

According to various embodiments, it may be determined whether the code task is non-deferrable or deferrable, wherein the code task, if determined to be essential, is decorated as non-deferrable, and wherein the code task, if determined to be deferrable, is decorated as deferrable (i.e., non-essential) for asynchronous post-return execution. In other embodiments, code tasks may be received as decorated deferrable or non-deferrable.

Decoration of code tasks may be done manually (e.g., by an author) as described herein or by a machine (e.g., a computer-implemented process), according to various embodiments. For example, a machine may programmatically identify and decorate code tasks as deferrable. Code tasks outside of locking that do not affect non-local data or the return value of a function may be decorated as deferrable for asynchronous execution. For another example, an author may indicate during coding that a particular code task is non-deferrable, or may indicate (e.g., through decoration or annotation) that a code task is non-essential, and therefore deferrable.

Code tasks that are decorated as non-deferrable ("non-deferrable code tasks") may be given priority over and executed before code tasks that are decorated as deferrable ("deferrable code tasks). Deferrable code tasks may return to a caller without being executed. Other code tasks may continue the execution runtime on the thread. Deferrable code tasks may therefore be deferred for execution as long as is needed if non-deferrable code tasks continue to be received by the thread. According to various embodiments, various code tasks may be decorated as deferrable without other code tasks being decorated as non-deferrable. For example, a deferrable code task could be deferred if competing with a code task that has not been decorated.

Additionally, in a software function, a code instance may contain code tasks that are in a critical path. The software function must perform its (essential) intended work quickly, and therefore it may be desired to allow this function to complete as quickly as possible. However, there may be a competing need to have some logging of the work once the essential code task has finished executing. In current systems, this may lead to various undesirable trade-offs such as logging work at the expense of executing essential code tasks expeditiously.

For example, in a software function, various code tasks on a critical path (essential) and the deferrable logging may belong to the same function, but the logging work may be completed after the return from the essential portion of the function. The source code for this function may be decorated and may identify the logging as deferrable work to be done asynchronously. The author of the function may therefore write a function that includes relevant logging related to the function, but specify that the non-critical (deferrable) section can be executed asynchronously, without switching contexts, after the essential code completes and returns to its caller on the thread. By not switching contexts, improvements in efficiency may be realized when compared with existing methods.

An author, for example, may identify (e.g., through tagging or decoration) non-essential, and therefore deferrable code (e.g., code tasks within code instances) that may be executed at an arbitrary, undefined point in the future. Common approaches may spawn a separate thread or context to handle various deferrable tasks and adds significant overhead. These schemes may not be practical for some deferrable operations, such as freeing memory. Aspects of the present disclosure may allow the author to optimize runtime performance by allowing the code tasks to be executed in the same context when execution runtime on a thread is idle, thus improving performance.

In addition to explicitly identifying work to be run asynchronously, according to various embodiments, input code tasks may be programmed to be run asynchronously by detecting characteristics of the various input code tasks. For example, it may be detected that a code task has characteristics indicating that the code task is outside of locking and does not affect the return value of a function. In certain examples, a code task may not affect non-local data, and may therefore by decorated as deferrable.

Sections of the set of code instances that correspond to code tasks that are deferrable may then be identified, according to various embodiments. It may be determined whether an execution runtime on the thread is idle. In response to finding that the thread is idle, the deferrable code tasks may be executed on the thread in the context. The identifying sections of the set of code instances that correspond to code tasks that are deferrable include utilizing decoration of the code tasks. The decoration may indicate that a code task is deferrable. If it is determined that a code task belongs to one or more of various categories of functions, the decoration may indicate that the code task is deferrable.

A function with work (code tasks) identified to be completed asynchronously may schedule the work to be run and then return to a caller with its result. The scheduled work may be run by delaying the work until the current thread is idle. The thread, including an execution runtime, may be idle for various reasons. For example, the thread may be idle due to waiting on a response from a computer component, waiting on a computer I/O operation, or if no code tasks remain on the thread. The execution runtime on a thread may also be idle if the thread is waiting on a component, e.g., a blocked I/O or a network/disk delay.

As stated herein, executing a code task that is deferrable may utilize non-blocking or asynchronous execution on the thread for execution. It may be determined when the execution runtime on a thread changes from idle to not idle. Code tasks identified as deferrable, may be deferred once a currently-executing code task has completed, allowing a non-deferrable task to resume execution on the execution runtime on the thread.

Various embodiments in the disclosure are directed to situations where an author is not concerned about certain code tasks being completed in a timely fashion. Examples of code tasks that may not need to be completed in a timely fashion may be the de-allocation of memory, the logging of informational data, and various others as described herein.

FIG. 1 illustrates a flowchart of a method 100 for executing code on a thread, according to various embodiments.

A thread may be provided at 108. The thread may be located in a context on a processor, such as a central processing unit (CPU) of a computer. The thread may be accessed in a context containing a set of code instances stored in memory, according to various embodiments.

The thread may access a caller 110. The caller may be accessed for the purposes of recursion performed during the method as described herein. The caller may then send code instances to a prioritization module, which may access a set of code instances at 112 and then identify deferrable code tasks at 114. Sections of the set of code instances that correspond to deferrable code tasks may be identified as is described herein.

The prioritization module may access a set of code instances 112, which may access both code tasks decorated as non-deferrable and code tasks decorated as deferrable. The prioritization module may access instances that contain a non-deferrable task and one or more deferrable tasks related to the non-deferrable task. For example, an instance may include a critical task and its associated logging work. The critical task may be decorated non-deferrable while the logging work may be decorated as deferrable and likewise deferred until the thread is idle.

The prioritization module may identify the thread status at 116. The thread may be determined to be idle or busy, according to various embodiments. If the thread is determined to be idle, the caller may return the prioritization module, according to various embodiments. If the execution runtime is determined to be busy, deferrable code tasks may not take priority over currently-processing code tasks on the thread. As deferrable code tasks may be intended to be non-blocking of non-deferrable functions, this would be a logical result.

If the thread is determined to be idle at 116, then tasks that are deferrable may be executed at 118 in the prioritization module. This execution of deferrable code tasks may continue for an indefinite amount of time, provided there is a supply of deferrable tasks to keep the thread busy.

Code tasks executing at 118 may complete execution at 120. The thread may be executing within the context. If no deferrable code tasks remain, the thread may become idle and return to the caller. Non-deferrable tasks, however, may interrupt execution of deferrable tasks, according to various embodiments. After a completed execution of a deferrable task, a subroutine may verify that there are no non-deferrable tasks awaiting execution. If there are non-deferrable tasks awaiting execution during execution of a deferrable code task, the deferrable code task may be interrupted at a nearest opportunity, while avoiding corruption of data, according to various embodiments. In the context, and in response to determining that the thread is idle, at least one deferrable code task may be executed.

Figure 2:
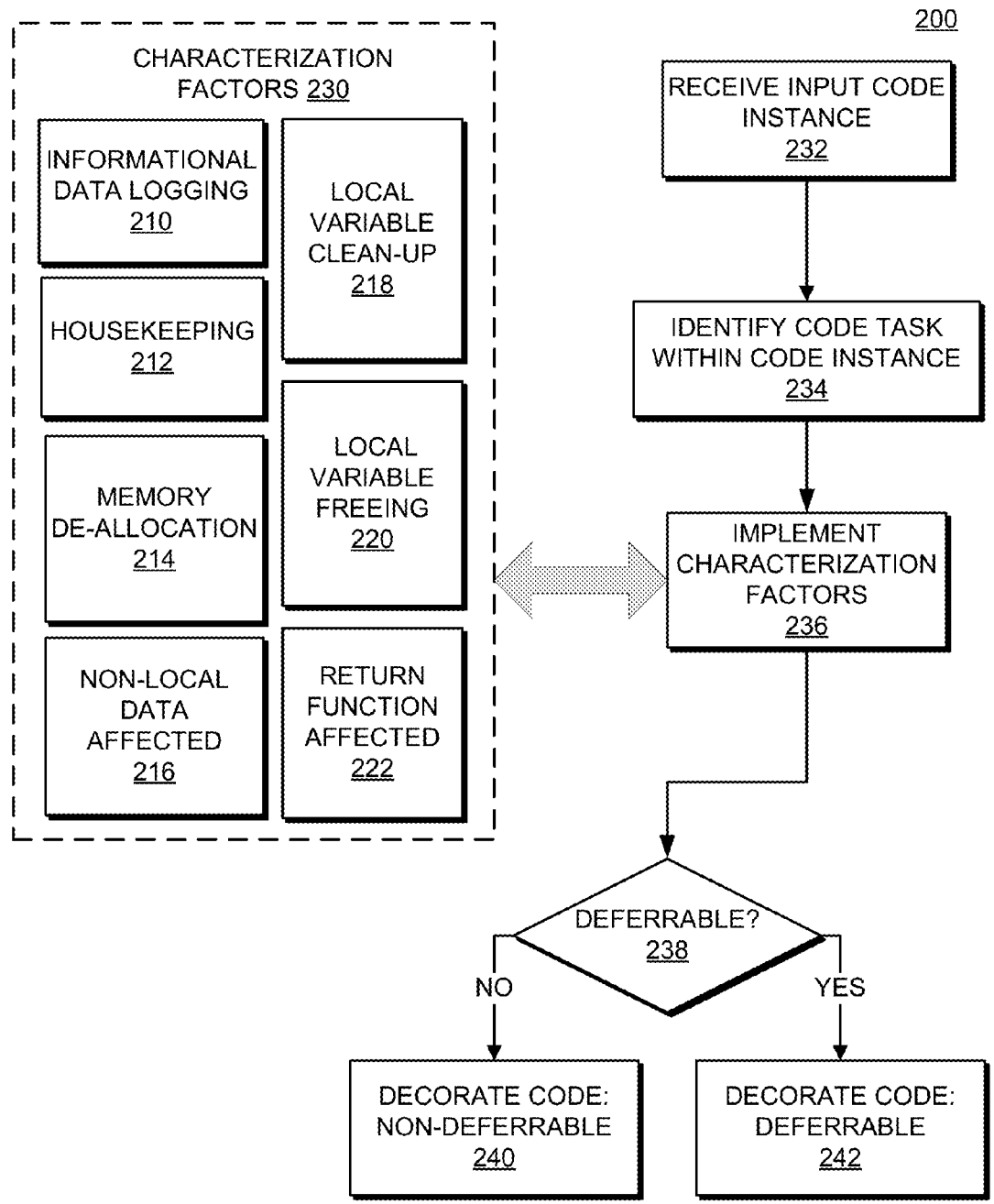
FIG. 2 illustrates a flowchart of a method for identifying deferrable code tasks, according to various embodiments.

FIG. 2 illustrates a flowchart of a method 200 for identifying deferrable code tasks, according to various embodiments. The flowchart of method 200 may identify deferrable code tasks, and may correspond to 114 of FIG. 1, according to various embodiments. A thread may receive an input code instance at 232. According to embodiments, a code task may be identified within the code instance at 234. According to other embodiments, multiple code tasks may be identified within the code instance. An example of a code instance may be a command to save a file on a computer. Within the code instance may be various other commands, represented by code tasks, which may compress the file as it is saved, determine a location to save the file, append an extension to the file and save a log of the work done.

Code characterization factors implementation at block 236 may implement one or more characterization factors 230. Each characterization factor may be used to determine if a code task is a non-deferrable or a deferrable code task. Various examples of characterization factors may be given as examples, but they are not meant to represent an exhaustive list of all possible factors and many other factors not listed may be utilized and are contemplated herein.

Various characterization factors 230 may be implemented at 236. The characterization factors 230 may include, but are not limited to code tasks selected from: informational data logging 210, housekeeping 212, memory de-allocation 214, non-local data affected 216, local variable clean-up 218, local variable freeing 220, or return function affected 222. The implementation of the characterization factors 236 may formulate a determination whether a code task is deferrable. Alternatively, a code task may be determined to be deferrable by an author and implementing characterization factors 236 may be skipped, according to various embodiments.

After implementing characterization factors at 236, a determination that the identified code task is deferrable may be determined at 238. A determination that the identified code task is deferrable may also be received at 238, according to various embodiments. The determination may be received from an author or a computer program, according to various embodiments. After the code task has been determined to be non-deferrable or deferrable, the code task may be decorated as non-deferrable at 240, or decorated as deferrable at 242, according to the determination. Referring to FIG. 1, the identified code tasks may then proceed to a prioritization module, according to various embodiments.

Figure 3:
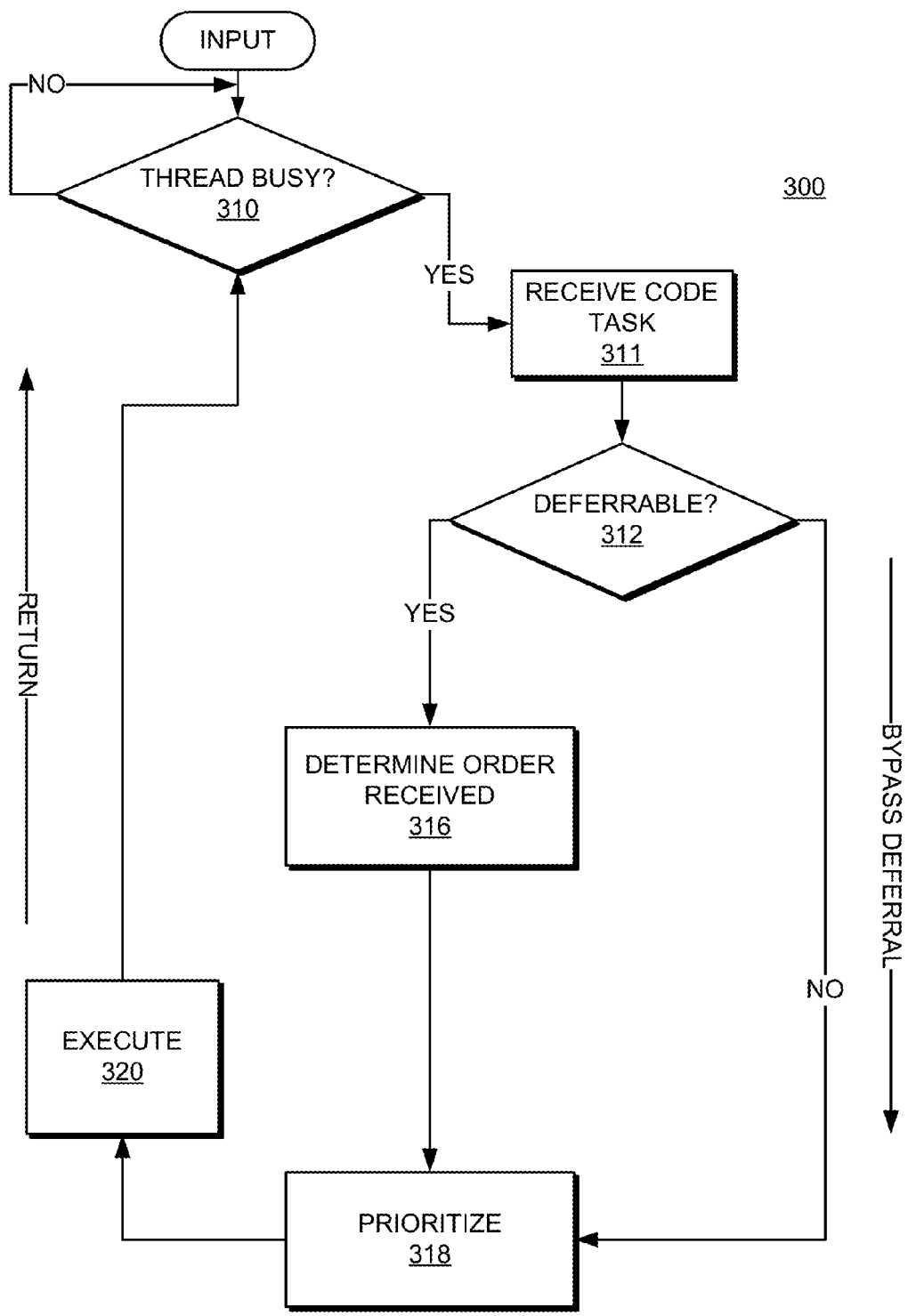
FIG. 3 illustrates a flowchart of a method for executing code on a thread, according to various embodiments.

FIG. 3 illustrates a flowchart of a method 300 for executing code on a thread, according to various embodiments. After receiving an input, a determination may be received at 310 whether a thread is busy. A thread is busy if it is not idle. In other words, a thread is busy if it is currently in use or in the process of execution of code tasks. If the thread is determined to not be busy (i.e., is idle), the cycle may repeat or may end, according to various embodiments. If the thread is determined to be busy, a code task may be received on the thread at 311 and the method depicted in the flowchart may proceed.

A determination may then be made whether the received code task is deferrable at 312. The determination may be made by reading a determined decoration of the code task as is further described in FIG. 2.

If the received code task is determined to be deferrable, the order received may then be determined at 316.

If the received code task is not determined to be deferrable, the deferral process may be bypassed.

Deferrable and non-deferrable (essential) code tasks may be prioritized at 318. The prioritization module 318 may be similar to prioritization modules found in other FIGs. as described herein. According to embodiments, prioritization at 318 may involve deferrable code tasks yielding to non-deferrable code tasks. In other words, critical functions may be prioritized to execute at a higher priority than non-critical functions (functions being embodied in code tasks). Stated simply, non-deferrable code tasks may be given priority over deferrable code tasks. If no non-deferrable code tasks remain, the order received of deferrable code tasks found at 316 may be utilized to order the deferrable code tasks such that the first received would be the first to be executed.

At 320, the prioritized code tasks may be executed according to the prioritized order of 318 and according to decoration status of the prioritized code tasks.

Following execution, it may again be determined whether the thread is busy at 310 and the cycle may repeat as appropriate.

Figure 4:
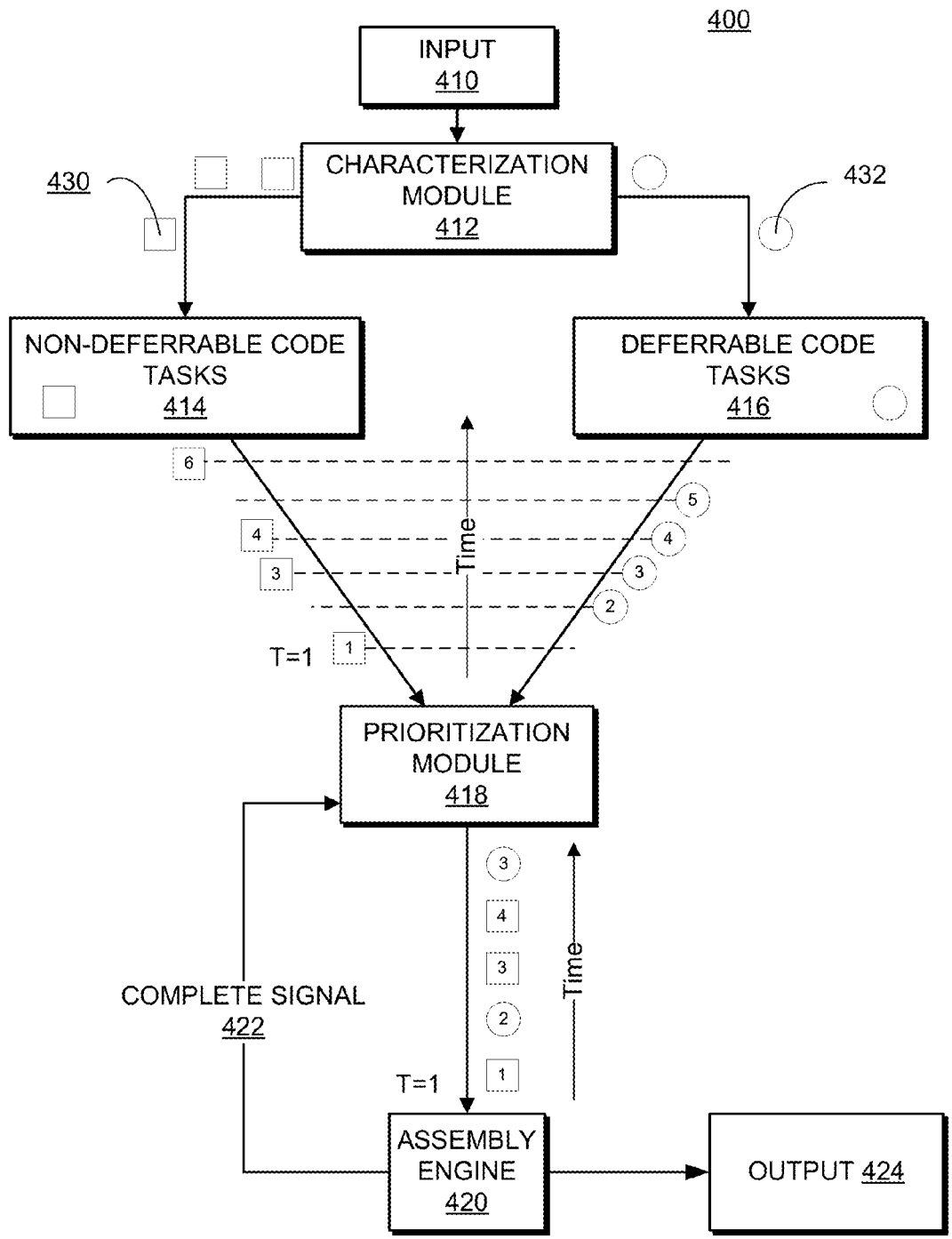
FIG. 4 illustrates a block diagram of a processing system for executing code on a thread, according to various embodiments.

FIG. 4 illustrates a block diagram of a processing system 400 for executing code on a thread, according to various embodiments. The processing system 400 illustrates an example visualization of code tasks as they are characterized, prioritized, scheduled, assembled and sent to a thread. The characterization module 412 may correspond to prioritization module in the discussion relating to FIG. 1, according to various embodiments. Individual code tasks are depicted in processing system 400 as non-deferrable code tasks 414 or deferrable code tasks 416. Also in FIG. 1, non-deferrable code tasks 414 are represented as squares, and deferrable code tasks 416 are represented as circles. For illustrative purposes, both non-deferrable and deferrable code tasks may be depicted along various stages of the processing system 400, according to various embodiments.

An input code instance at 410 may be received by the characterization module 412. The characterization module may described in more detail in FIGS. 1 and 2, and respective accompanying description. The input code instance may contain one or more code tasks. Each code task may then be characterized by a code characterization module at 412 as either non-deferrable or deferrable, is described herein.

The characterization module may then output decorated code tasks including non-deferrable code tasks 414 and deferrable code tasks 416, according to various embodiments. If the code characterization module 412 characterizes a code task as non-deferrable, the code task may be decorated as non-deferrable at 414. If the code characterization module instead characterizes a code task as deferrable, the code task may be decorated as deferrable at 416.

A prioritization module 418 may receive non-deferrable and deferrable code tasks, taking a reading of decoration and the point in time that each code task was received. The prioritization module 418 may be similar to the prioritization module described in the discussion of FIG. 1. Returning to FIG. 4, a pair of streams of code tasks may be received by the prioritization module 418. Non-deferrable code tasks may be scheduled synchronously, whereas the deferrable code tasks may be scheduled asynchronously, in a non-blocking execution scheme. A decorated code task may be scheduled at 418 from decorated code tasks 414 (non-deferrable) and 416 (deferrable).

The various decorated code tasks may then be received and assembled by the assembly engine 420. The assembly engine 420 may receive the ordered code tasks from the prioritization module 418. The assembly module may reassemble the code tasks into complete instances, or otherwise organize the executed tasks as may be useful in various contexts.

As depicted in this FIG. 4, decorated code tasks 414 (non-deferrable) and 416 (deferrable), represented by squares and circles, are labeled with a number. The numbers depicted in the squares and circles represent the order in time that each type of decorated code task is received, with relation to the other code tasks. For example, a circle with a 3 in it represents a deferrable code task received at time 3. As the code tasks depicted arrived at the prioritization module 418, the code tasks may be prioritized based on the order received and the status of the code tasks. An example of a deferred code task is deferrable code task (represented with a circle) number 3. Though the prioritization module received deferrable code task 3 at the same time as non-deferrable code task 3 and before non-deferrable code task 4, deferrable code task 3 is prioritized after non-deferrable code tasks 3 and 4, according to an embodiment.

A complete signal 422 may be sent by the assembly engine to the prioritization module, indicating when various assembly stages are complete. The prioritization module may interpret a complete signal and perform various actions in response to a received complete signal. Examples of actions that could be performed upon receipt of a complete signal may include, but are not limited to, re-assembly of code tasks into instances or other programs, and various other compilation or other functions. Complete signals and assembled code may occur concurrently or at different times, according to various embodiments. The assembly engine output code may then be transmitted to the thread 424, where the code may be executed in a single context.

Figure 5:
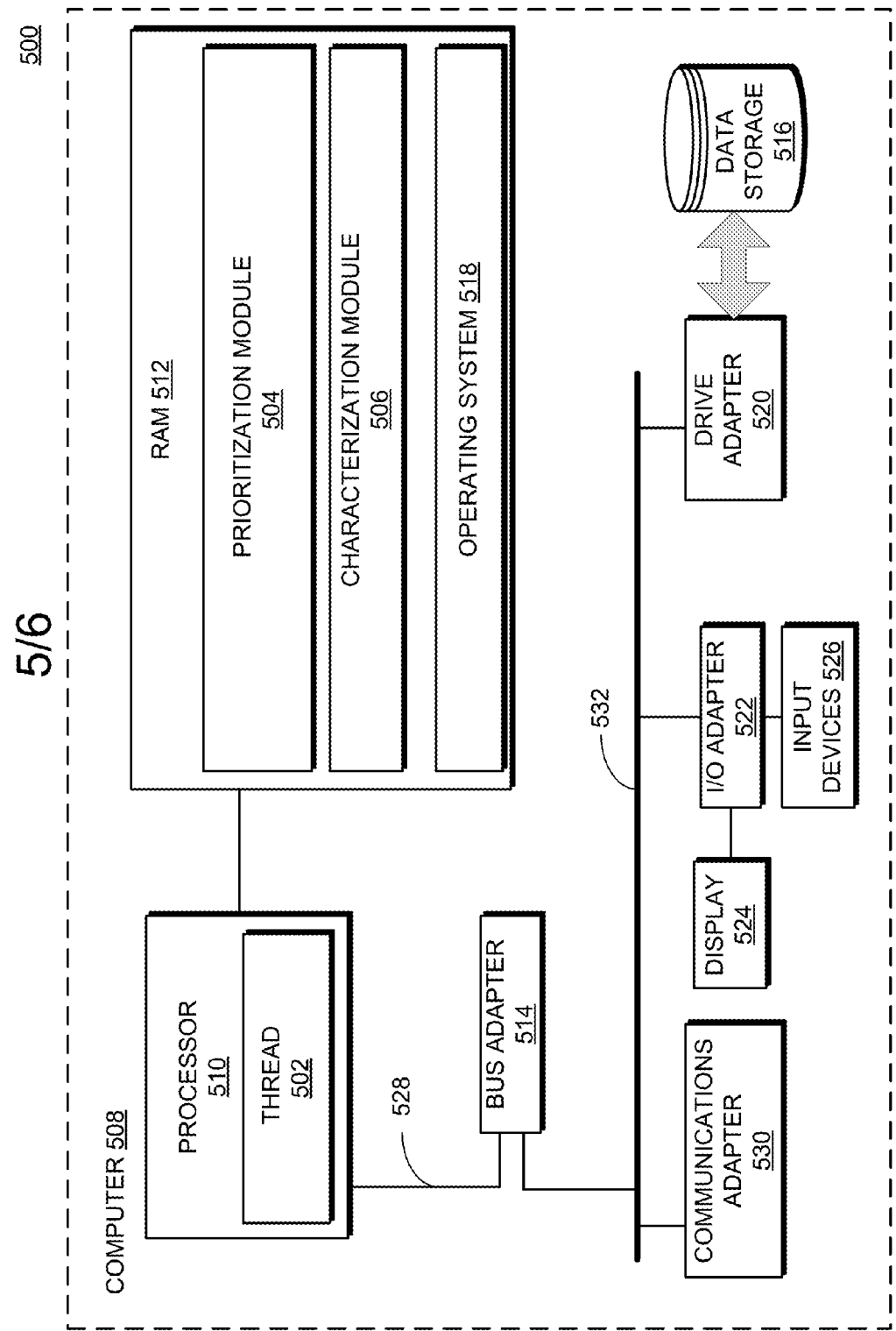
FIG. 5 illustrates a block diagram of automated computing machinery, according to various embodiments.

FIG. 5 illustrates a block diagram of automated computing machinery 500, according to various embodiments. The computing machinery may include example computer 508 useful in performing aspects of the disclosure, according to various embodiments. The computer 508 of FIG. 5 includes at least one computer processor 510 or "CPU" as well as random access memory 512 (RAM) which is connected through bus adapter 514 to processor 510 and to other components of the computer 508. The computing machinery 508 or the CPU 510 may include one or more computer processing circuits.

The RAM 512 may include a characterization module 506. The characterization module 506 may decorate code tasks as either deferrable or non-deferrable, according to various embodiments. The decorated code tasks may be stored to or read from data storage 516, which may be a hard disk drive, according to various embodiments. Decorated code tasks may be received from an author or the characterization module 506 may assess priority of code tasks based on objective criteria.

The RAM 512 may include a prioritization module 504. The prioritization module 504 may determine which code tasks are processed at a point in time on a thread 502. The code tasks may be populated into the data storage 516. The prioritization module 504 may access the decoration of various input code tasks stored in the data storage 516.

The RAM 512 may include an operating system 518. Operating systems useful for record filtering according to embodiments of the present disclosure include UNIX®, Linux®, Microsoft XP™, AIX®, IBM's i5/OS™, and others. The operating system 518 are shown in RAM 512, but many components of such software typically are stored in non-volatile memory also, such as, for example, on a disk drive 516.

The computer 508 may also include disk drive adapter 520 coupled through expansion bus 532 and bus adapter 514 to processor 510 (and accompanying thread 502) and other components of the computer 508. Disk drive adapter 520 connects non-volatile data storage to the computer 508 in the form of disk drive 516. Disk drive adapters useful in computers include Integrated Drive Electronics ('IDE') adapters, Small Computer System Interface ('SCSI') adapters, Serial AT Attachment ('SATA'), and others. Non-volatile computer memory also may be implemented for as an optical disc drive, electrically erasable programmable read-only memory (so-called 'EEPROM' or 'Flash' memory), RAM drives, etc.

The data storage 516 may include one or more storage devices in a tiered or non-tiered configuration. The data storage 516 may include one or more code task inputs that are received by the application and stored for later use by the thread 502 through prioritization module 504.

The example computer 508 may include one or more input/output (I/O) adapters 520. I/O adapters implement user-oriented input/output through, for example, software drivers and computer hardware for controlling output to display devices such as computer display screens 524, as well as user input from user input devices 526 such as keyboards, mice, styli, or touchscreens, according to various embodiments. The example computer 508 may include a video adapter at 520, which is an example of an I/O adapter specially designed for graphic output to a display device 524 such as a display screen or computer monitor. The video adapter (I/O) would be connected to processor 510 through a high speed video bus 564, bus adapter 514, and the front side bus 528, which is also a high-speed bus.

The example computer 508 includes a communications adapter 530 for data communications with other computers, for example, mobile devices, and for data communications with a data communications network. Such data communications may be carried out serially through RS-232 connections, through external buses such as a Universal Serial Bus (USB), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and IEEE 802.77 adapters for wireless data communications network communications.

The descriptions of the various embodiments of the present disclosure have been presented for purposes of illustration, but are not intended to be exhaustive or limited to the embodiments disclosed. Many modifications and variations will be apparent to those of skill in the art without departing from the scope and spirit of the described embodiments. The terminology used herein was chosen to best explain the principles of the embodiments, the practical application or technical improvement over technologies found in the marketplace, or to enable others of skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 6 illustrates an example of pseudocode for executing code on a thread 600, according to various embodiments.

The example of pseudocode, as depicted in this FIG., may be illustrative of code relating to reading a decorated code task. The code task, if decorated, may be read and prioritized, as is depicted in various FIGs., described herein. This pseudocode is not intended to limit this disclosure, but merely to illustrate one embodiment of code that may be used to carry various aspects of this disclosure. The example of pseudocode is not intended to be limited to a particular code language, but merely to be an exemplar of written code. The illustrative pseudocode may also be code written in various other languages, according to various embodiments.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present disclosure is not necessarily limited to such applications, various aspects of the disclosure may be appreciated through a discussion of various examples using this context.

The descriptions of the various embodiments of the present disclosure have been presented for purposes of illustration, but are not intended to be exhaustive or limited to the embodiments disclosed. Many modifications and variations will be apparent to those of skill in the art without departing from the scope and spirit of the described embodiments. The terminology used herein was chosen to explain the principles of the embodiments, the practical application or technical improvement over technologies found in the marketplace, or to enable others of skill in the art to understand the embodiments disclosed herein.

What is claimed is:

1. A method for prioritizing code execution without maintaining reference counts and without switching contexts, comprising:
   accessing a thread on a processor, wherein the thread is in a context containing a set of code instances;
   identifying sections of the set of code instances that correspond to deferrable code tasks, wherein identifying sections of the set of code instances comprises:
      receiving an input code instance;
      identifying a code task within the input code instance;
      receiving a determination that the identified code task is deferrable, wherein receiving the determination that the identified code task is deferrable includes utilizing one or more characterization factors, wherein the one or more characterization factors are selected from a group consisting of: informational data logging, housekeeping, local variable clean-up, local variable freeing, memory de-allocation, non-local data affected, and whether a return function is affected; and
      decorating the code task as deferrable;
   executing the thread in the context;
   determining that the thread is idle; and
   executing, in the context, at least one of the deferrable code tasks, wherein the deferrable code task is executed within the context and in response to determining that the thread is idle.

2. The method of claim 1, wherein receiving the determination that the identified code task is deferrable further includes receiving the determination from an author.

3. The method of claim 1, wherein determining whether the thread is idle includes determining that the thread is waiting on a response from a computer component.

4. The method of claim 1, wherein the determining that the thread is idle is in response to a determination that no code tasks remain on the thread.

5. The method of claim 1, further comprising:
   determining that the thread changes from idle to busy;
   determining that a non-deferrable code task is executing in response to the thread changing from idle to busy; and
   prioritizing, in response to determination that a non-deferrable code task is executing, execution of received deferrable and non-deferrable code tasks, wherein a deferrable code task is executed in response to determining that no non-deferrable code tasks are executing.

* * * * *